(12) United States Patent
Fee et al.

(10) Patent No.: US 9,128,788 B1
(45) Date of Patent: *Sep. 8, 2015

(54) MANAGING QUIESCE REQUESTS IN A MULTI-PROCESSOR ENVIRONMENT

(71) Applicant: International Business Machines Corporation, Armonk, NY (US)

(72) Inventors: Michael F. Fee, Cold Spring, NY (US); Deanna Postles Dunn Berger, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,761

(22) Filed: Sep. 30, 2014

Related U.S. Application Data

(63) Continuation of application No. 14/211,810, filed on Mar. 14, 2014.

(51) Int. Cl.
G06F 9/54 (2006.01)
G06F 9/46 (2006.01)

(52) U.S. Cl.
CPC .............. G06F 9/546 (2013.01); G06F 9/466 (2013.01)

(58) Field of Classification Search
None
See application file for complete search history.

(56) References Cited

U.S. PATENT DOCUMENTS

| 8,572,624 | B2 | 10/2013 | Heller et al. |
|---|---|---|---|
| 8,595,469 | B2 | 11/2013 | Heller |
| 2002/0083149 | A1 | 6/2002 | Van Huben et al. |
| 2009/0216928 | A1 | 8/2009 | Heller et al. |
| 2011/0145550 | A1 | 6/2011 | Greiner et al. |
| 2014/0025922 | A1 | 1/2014 | Heller et al. |

Primary Examiner — Tuan Dao
(74) Attorney, Agent, or Firm — Cantor Colburn LLP; Margaret McNamara

(57) ABSTRACT

Embodiments relate to managing quiesce requests in a multi-processor system. Aspects of the embodiments include receiving a quiesce request at a quiesce controller from a requesting processor, the requesting processor being one of a plurality of processors in a multi-processor system, and determining that the quiesce request is not accepted by the quiesce controller. Aspects also include, based on the quiesce request being not accepted by the quiesce controller, generating a reject message configured to indicate that the quiesce request has been rejected, holding the reject message until a quiesce command is broadcast to the multi-processor system, the quiesce command based on a different quiesce request, and sending the reject message to the requesting processor based on the broadcast of the quiesce command being detected by the quiesce controller.

18 Claims, 5 Drawing Sheets

US 9,128,788 B1

MANAGING QUIESCE REQUESTS IN A MULTI-PROCESSOR ENVIRONMENT

This application is a continuation application of the legally related U.S. Ser. No. 14/211,810 filed Mar. 14, 2014, the contents of which are incorporated by reference herein in their entirety.

BACKGROUND

The present invention relates generally to processing within a computing environment, and more specifically, to managing multiple quiesce requests of error data.

An existing feature in a large multi-processor system is the ability to quiesce all processors within a target zone. Quiesce functions operate to temporarily pause or alter the state of a processor or group of processors to perform, e.g., system updates or backups. In some instances, a quiesce interruption is applicable to only a subset of the system resources. In such instances, the system can be divided into different zones. For a quiesce operation applicable to one zone (a target zone), processors outside of the target zone are permitted to continue running, although new translations may be blocked. Typically, at least one system controller or other mechanism broadcasts the quiesce to all physical processors in the system, handles collecting quiesce state information and indicates to a requesting processor when all processors have started, or are ignoring (filtering) the quiesce request.

SUMMARY

An embodiment of a computer program product for managing quiesce requests includes a computer readable storage medium having program instructions embodied therewith, wherein the computer readable storage medium is not a signal, the program instructions readable by a processing circuit to cause the processing circuit to perform a method. The method includes receiving a quiesce request at a quiesce controller from a requesting processor, the requesting processor being one of a plurality of processors in a multi-processor system, and determining that the quiesce request is not accepted by the quiesce controller. The method also includes, based on the quiesce request being not accepted by the quiesce controller, generating a reject message configured to indicate that the quiesce request has been rejected, holding the reject message until a quiesce command is broadcast to the multi-processor system, the quiesce command based on a different quiesce request, and sending the reject message to the requesting processor based on the broadcast of the quiesce command being detected by the quiesce controller.

An embodiment of a computer implemented method for managing quiesce requests includes receiving a quiesce request at a quiesce controller from a requesting processor, the requesting processor being one of a plurality of processors in a multi-processor system, and determining that the quiesce request is not accepted by the quiesce controller. The method also includes, based on the quiesce request being not accepted by the quiesce controller, generating a reject message configured to indicate that the quiesce request has been rejected, holding the reject message until a quiesce command is broadcast to the multi-processor system, the quiesce command based on a different quiesce request, and sending the reject message to the requesting processor based on the broadcast of the quiesce command being detected by the quiesce controller.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
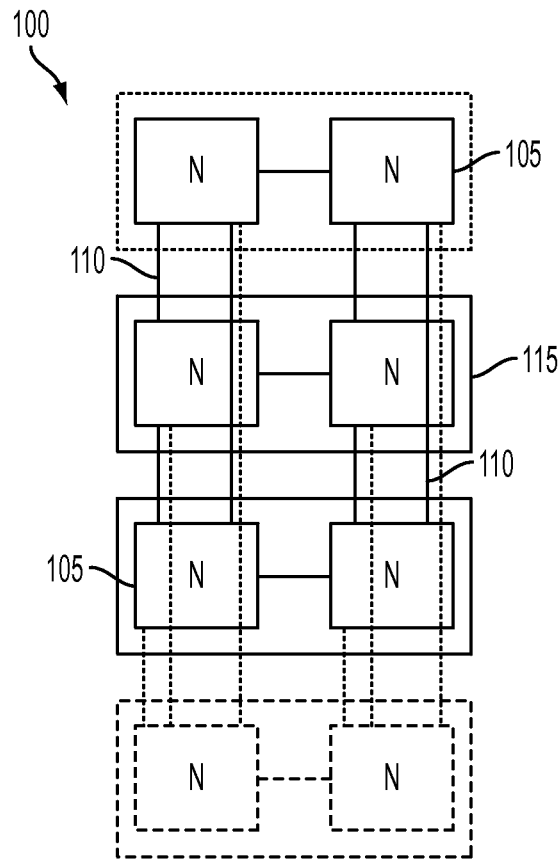
FIG. 1 depicts a processing system in accordance with an embodiment.

Apparatuses, systems and methods are provided for management of aspects of system quiesce operations. An embodiment includes a controller or other mechanism for receiving quiesce requests from one or more processors in a multi-processor system. The controller is configured to manage communication between processors requesting quiesce and the system's quiesce mechanism. The controller may operate in communication with the quiesce mechanism, or may include additional aspects of the quiesce mechanism such as functionality for selecting and/or accepting a quiesce request and broadcasting a quiesce command to the system to cause processors in the system to quiesce.

In response to receiving a quiesce request from a processor, the controller determines whether the quiesce request is accepted and the requested quiesce operation is to be performed. If the request is accepted, an associated quiesce command is broadcast to all of the processors in the multi-processor system.

If a previous quiesce request from another processor has already been accepted, the controller generates a reject message that indicates to the requesting processor that the quiesce request has not been accepted. The controller does not immediately send the reject message to the requesting processor, but rather determines whether the quiesce mechanism has broadcasted a request command for the previous request. If the request command has been sent, the controller sends the reject message to the requesting processor. However, if the request command has not yet been broadcast, the controller waits until the request command is broadcasted, and then sends the reject message.

Embodiments described herein address drawbacks of current systems and methods. For example, in existing reject mechanisms, when a processor receives a reject for a quiesce request that did not gain access to the quiesce mechanism (e.g., a quiesce state machine) but has not yet seen the quiesce request broadcast, the processor retries the quiesce operation. Depending on the size of the multi-processor system (e.g., the size of a distributed cache hierarchy) it may take varying amounts of time to propagate the broadcast to all the processors in the system. A processor that did not win initial access may end up retrying the request and get rejected multiple times before the broadcast arrives, causing unnecessary activity on the busses between the processor and other parts of the system.

In addition, in some current systems that utilize "fast quiesce" operations, processors have a threshold number of rejects. When the threshold number of rejects received by a processor is reached, the processor replaces the attempted fast quiesce with a much slower "conventional" version of quiesce, causing a much more significant system performance impact than the aptly named fast quiesce.

Embodiments described herein address these disadvantages by delaying the sending of reject messages to requesting processors until after the requesting processor and/or the controller has detected the broadcast. In this way, multiple reject and retry loops between the requesting processor and the controller (as well as other processors and controllers in the system) can be avoided, which reduces the processing burden on the system.

In addition, systems that include multiple quiesce mechanisms or quiesce controllers, such as a quiesce controller on multiple chips or nodes, typically designate a master quiesce controller to which all quiesce requests are routed. If multiple processors are requesting quiesce simultaneously, routing the requests from one or more local quiesce controllers to the master quiesce controller can cause high utilization of system (e.g., chip to chip, node-to-node, drawer-to-drawer) busses and cause a performance detriment.

Other embodiments described herein reduce this high utilization by filtering outbound requests off of a quiesce controller. In one embodiment, each quiesce controller in the system includes a filtering mechanism that restricts the number of requests that can be sent from a quiesce controller to other quiesce controllers and associated processors in the system. For example, when a quiesce operation is not operating and a broadcast including a quiesce command has not yet been received from the master quiesce controller, the local quiesce controller selects the first quiesce request that it has received and sends only the selected quiesce request to the system and the master quiesce operation.

Turning now to FIG. 1, an embodiment of a multi-processor computing, processing and/or data management system 100 is generally shown. The system 100 includes multiple nodes 105 connected in communication with one another via suitable connectors 110 such as wires, cables and optical fibers. The nodes 105 may be any processing and/or storage system such as a computer, server, data center, cache system or mainframe computer. The connectors 110 may include any of various connectors, ports, switches and other devices, and with the nodes 105 form a network or fabric. The nodes 105 can be configured as, e.g., servers 115 or other multi-node computing device, but are not so limited. Exemplary systems including systems such as mainframes based on the IBM® z/Architecture described in "z/Architecture Principles of Operation" SA22-7832-09 (August, 2012) from IBM®, which is incorporated by reference herein in its entirety.

Figure 2:
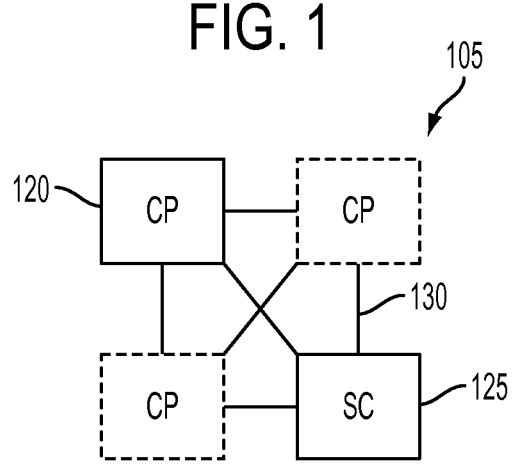
FIG. 2 depicts a node of the processing system of FIG. 1 in accordance with an embodiment.

FIG. 2 illustrates an exemplary data storage and/or processing system that may form all or part of a node 105. A plurality of central processors (CP) 120 are operatively connected to one another and/or to other components, such as a storage control (SC) processor 125. In one embodiment, the CPs 120 and/or the SC 125 are integrated in a package such as a multi-chip module (MCM) and connected via conductors 130. In one example, the MCM is a component of a data center, mainframe, server or other data storage device. In this embodiment, the MCM may be connected to memory devices such as disk drives or tape drives. The MCM may also be connected in communication with other nodes 105 via fabric connectors, channels and/or other connectors.

Figure 3:
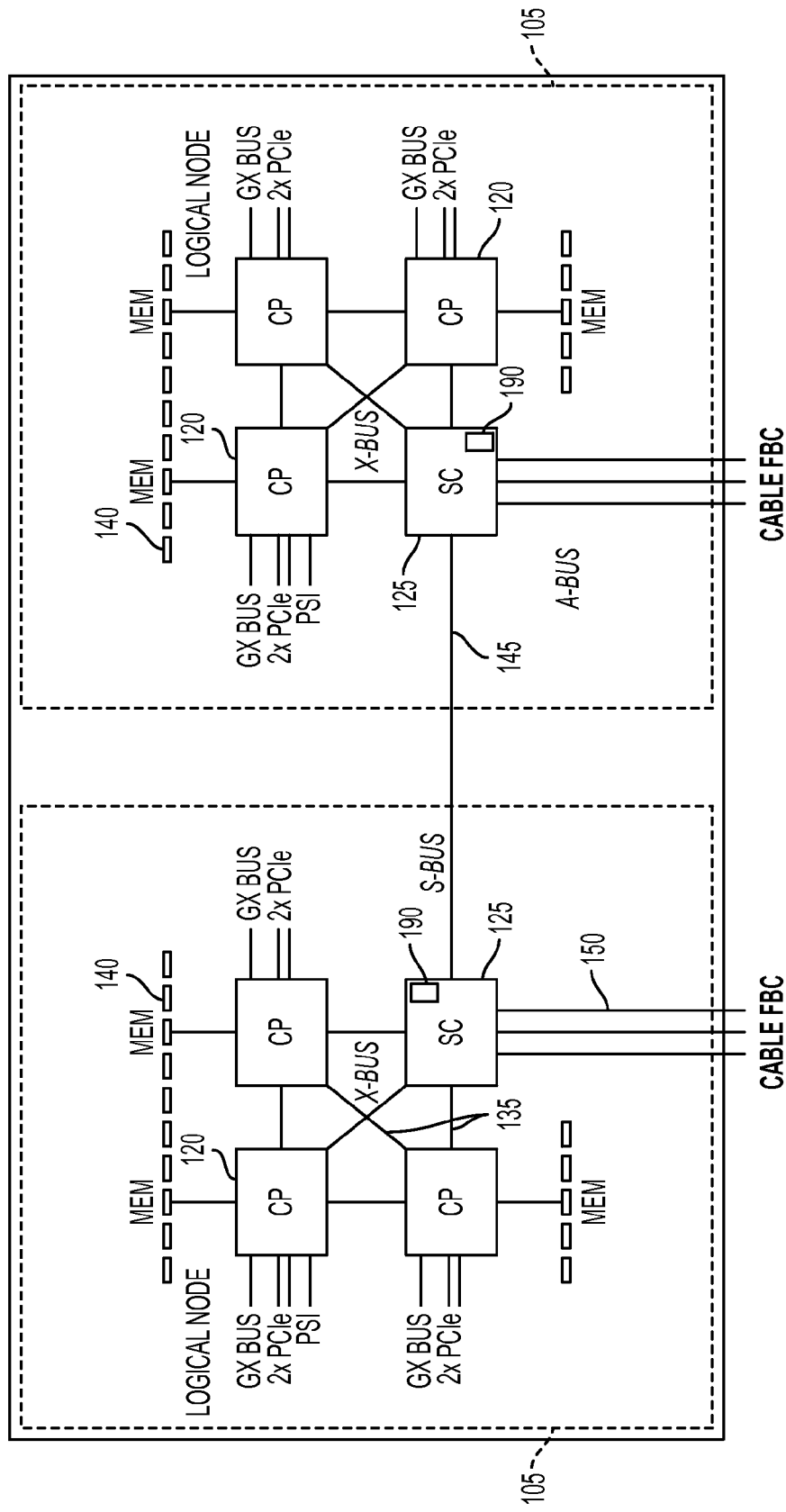
FIG. 3 depicts an example of the node of FIG. 2 in accordance with an embodiment.

FIG. 3 illustrates an example of a portion of a multi-processor system having a cache topology that may form all or part of a node 105, or from multiple nodes 105. In this example, each node 105 includes a plurality of CPs 120 (also referred to as central processing units) are operatively connected via busses 135 (e.g., X-Busses) to one another and/or to one or more SCs 125. In one embodiment, the CPs 120 and the SCs 125 are integrated in a package or packages such as one or more multi-chip modules (MCMs). In one example, the MCMs are components of a data center, mainframe, server or other data storage device. In this embodiment, the CPs 120 are connected to memory devices 140 such as disk drives. Each MCM and/or node 105 may also be connected in communication with other nodes 105 via connectors such as system busses 145 (e.g., for on-drawer chips) and fabric connectors 150, channels and/or other connectors. The central processors and caches are not limited to the embodiments described herein, and may be any type of processing and/or storage component such as a microprocessor, memory area and/or logical entity.

Figure 4:
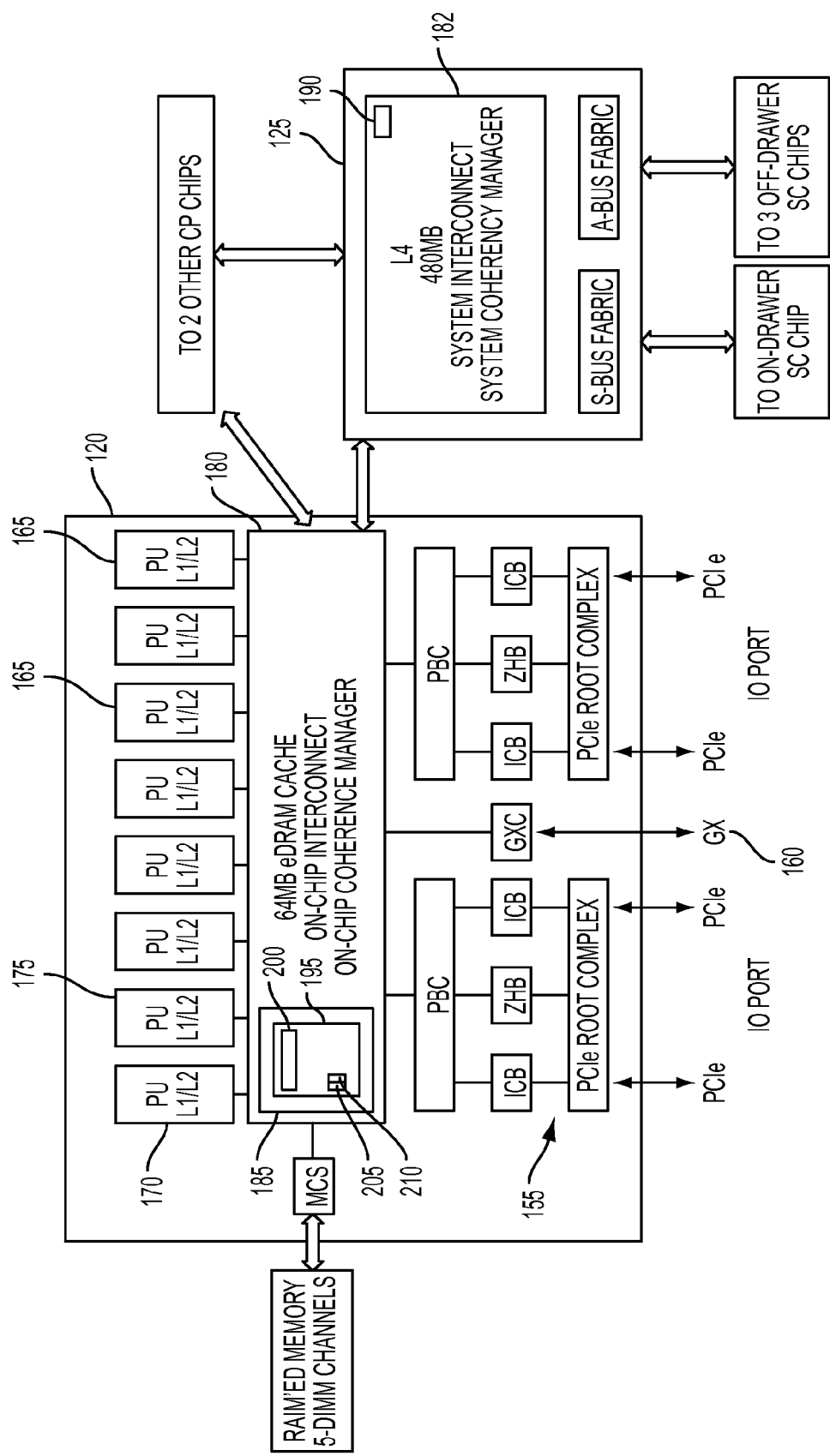
FIG. 4 depicts an example of a central processor chip in accordance with an embodiment.

Referring to FIG. 4, the CPs 120 may include additional components to facilitate functions such as processing, communication and data transfer, such as I/O devices 155, which may include input devices (or peripherals) and/or output devices (or peripherals), and fabric connectivity devices 160. The devices 155 and 160 may include devices for communicating with other processors such as other CPs 120, nodes 105 and servers. The I/O devices 155 and/or devices 160 can also include components for communicating over various networks, such as the Internet or an intranet.

In one embodiment, each of the central processors (CP) 120 includes one or more cores 165, also referred to as processing units (PUs), which perform the reading and executing of instructions. On each central processor (CP) 120, the cores 165 are operatively connected via busses to one or more storage components such as level 1 (L1) caches 170, one or more level 2 (L2) caches 175, and at least one level 3 (L3) cache 180. The cores 165 may also be connected to one or more components on other chips, such as one or more L4 caches 182. One or more of the L1 caches 170, the L2 caches 175, the L3 cache 180 and the L4 caches 182 include their own respective cache controllers for controlling various operations such as sending, receiving, and executing requests (also referred to as request signals). An exemplary cache controller is a L3 cache controller 185.

As described herein, a "processor" refers to any device or mechanism capable of receiving and/or sending instructions or other messages, and processing data, e.g., performing algorithms, controlling storage, performing input/output functions, etc. A processor may be, for example, a core 165, central processor 120, node 105 or server 115.

In addition, processors may be logical processors, such as virtual machines. For example, groups of processors (e.g., CPs 120) can be logically combined as logical partitions, each of which is capable of functioning as a separate system and represents all or a share of physical processor resources allocated to the partition. Each logical partition can be independently reset, initially loaded with an operating system, if desired, and operate with different programs. The processors (e.g., CPs 120) of a particular partition may be either dedicated to the partition, so that the underlying processor resource is reserved for that partition; or shared with another partition, so that the underlying processor resource is potentially available to another partition.

In one embodiment, the system 100 includes functionality for requesting and performing quiesce operations for a processor or group of processors. If a user wants to quiesce a multi-processor system or portion thereof, the system receives a quiesce instruction and a processor (e.g., core 165) requests a quiesce operation by sending a quiesce request such as a fast quiesce request to a quiesce mechanism such as a quiesce controller. If no other quiesce or fast quiesce request has already been accepted, the quiesce controller will forward the quiesce request to another quiesce controller or broadcast a quiesce command to all the processors in the system. Upon broadcast of quiesce command or detection of the broadcast, the quiesce controller sends a response back to the initiating or requesting processor indicating that the request was accepted. If, however, there is already another quiesce or fast quiesce request being processed, the quiesce controller will send a response back to the requesting processor indicating that the request has been rejected. If the response was rejected, the requesting processor nullifies and reissues the request.

In many cases, the requesting processor requests quiesce that is not applicable to all processors in the system, but is rather applicable to a subset or group of processors, referred to herein as a zone. For example, the system 100 can be organized into multiple zones. If processors (receiving processors) in a first zone receive a quiesce command initiated by a processor (initiating or requesting processor) in a different second zone, there is no need for processors running in the first zone to be interrupted. Thus, the processors in the first zone do not quiesce.

In order to control operation of quiesce functions, a quiesce controller is configured to receive quiesce requests, generate quiesce commands, and guarantee that only one quiesce is active in a zone at any given time. For example, the quiesce controller maintains a Quiesce State Machine (QSM) that tracks the progress of quiesce requests in the system. In one embodiment, the QSM tracks if the quiesce controller is idle, is waiting for processors to handle the broadcasted quiesce command, or is waiting for the requesting processor to reset the quiesce request indicating it has performed its update or other function for which the quiesce was requested.

In use, the quiesce controller (e.g., in the SC 125 or the L4 cache 182) determines whether the QSM is busy processing a previous request (e.g., not in an idle state). If the QSM is busy, the quiesce controller will reject the request. If the QSM is idle, the quiesce controller will accept the quiesce request and forward the request to all processors in a multi-processor system. Once receiving an indication from the requesting processor to unquiesce, the quiesce controller sends an unquiesce command and resets the QSM to the idle state. The QSM is now ready to handle the next quiesce request. In one embodiment, only one quiesce or fast quiesce operation per zone is allowed in the system at any one time.

FIGS. 3 and 4 illustrate examples of quiesce controller configurations. In one example, if a SC is present, a quiesce controller 190 may be included therein, for example in one or more L4 caches 182.

In one embodiment, one or more quiesce controllers are included with each CP 120 in the system. For example, as shown in FIG. 4, a quiesce controller 195 is housed in the L3 (shared) cache controller 185. In this embodiment, because a quiesce controller is housed with each CP 120 chip, a quiesce controller (or quiesce reject controller) in an SC chip is not necessary.

For example, a quiesce controller includes an instance of a QSM on each slice of the L3 cache controller on each processor (CP) chip, rather than relying on a SC to house the QSM. In this example, each of two slices (instances) of the on-chip L3 cache controller contain logic serves as a unique Fast Quiesce State Machine (FquiSM) 200.

As shown above, multiple quiesce controllers may be used in the system. In such embodiments, a quiesce controller is configured to receive quiesce requests from a respective group of processors. For example, the quiesce controller 190 handles requests from all processors in MCM, and the quiesce controller 195 handles requests from all processors in the CP 120. One of the quiesce controllers is designated the master controller for the system 100.

For example, one of the CP chips 120 in the system 100 is designated as the Master Fast Quiesce State Machine chip. Any processor can issue a quiesce request (e.g., a fast quiesce request or "Fqui"), and regardless of which quiesce controller receives the request, it is the master FQuiSM instance (e.g., a programmably selected instance on the master CP 120) that determines which request gains access first. This instance of the FquiSM determines which request will be the system wide "winner" and gain access to quiesce the other processors in a respective zone. This means any other processor's Fqui requests must travel across the system busses to the Master FquiSM. Since one processor chip in the system is designated the Master Fqui SM chip, this allows for the quiesce mechanism to be implemented on a single or multiple processor chip system without requiring the presence of an SC chip.

Each quiesce controller includes functionality to control the sending of reject messages to initiating processors. If a quiesce controller (or master quiesce controller) receives a quiesce request and the QSM is busy, the quiesce controller sends a reject message (also referred to simply as a reject) to the initiating processor. This control of sending reject messages may be implemented by a separate controller (referred to, e.g., as a reject controller) in communication with the quiesce controller or be implemented as part of the quiesce controller. The controller may be implemented in hardware and/or software, e.g., using millicode or microcode. Descriptions of the quiesce controller are intended to encompass either implementation.

For example, the controller (which may be loaded from the processor to the cache controller) is a separate single or multifunctional controller that handles the reject functionality, and may be loaded from to a cache controller the processor when a quiesce operation is initiated or requested. From there, the quiesce operation is loaded into the actual quiesce controller or state machine. The quiesce operation may be then forwarded from there to the other chips or processor groups in the system.

In one embodiment, the quiesce controller is configured to detect that a reject needs to be sent, but delay the sending of that reject to the requesting core or other initiating processor until the winning quiesce broadcast has been sent to all processors in a multi-processor system. The quiesce controller delays sending the reject during the time window in which a different accepted request is in progress but a broadcast to stop new requests has not yet been sent.

In one embodiment, the quiesce controller includes a filtering mechanism to control the requests that are launched from the quiesce processor to other quiesce processors in different parts of the system. The quiesce controller may receive multiple requests from multiple processors (e.g., from different cores 165). The quiesce controller selects one of the requests and only sends that request if it has not yet received a broadcast indicating that the master QSM has already begun processing a preceding quiesce request.

This embodiment provides the advantage of preventing the propagation of multiple requests from a quiesce controller to the system by filtering the outbound requests off a given CP chip, such that only one outstanding request is allowed off chip at once. If the quiesce controller is provided for a multiple-chip processor group (e.g., node 120), the quiesce controller (e.g., the SC chip 125) has similar filtering to prevent multiple requests from the same system node. This embodiment minimizes traffic on the shared system busses, improves system performance and reduces the likelihood of an outstanding request from a given CP chip getting a reject back from its fabric request.

Figure 5:
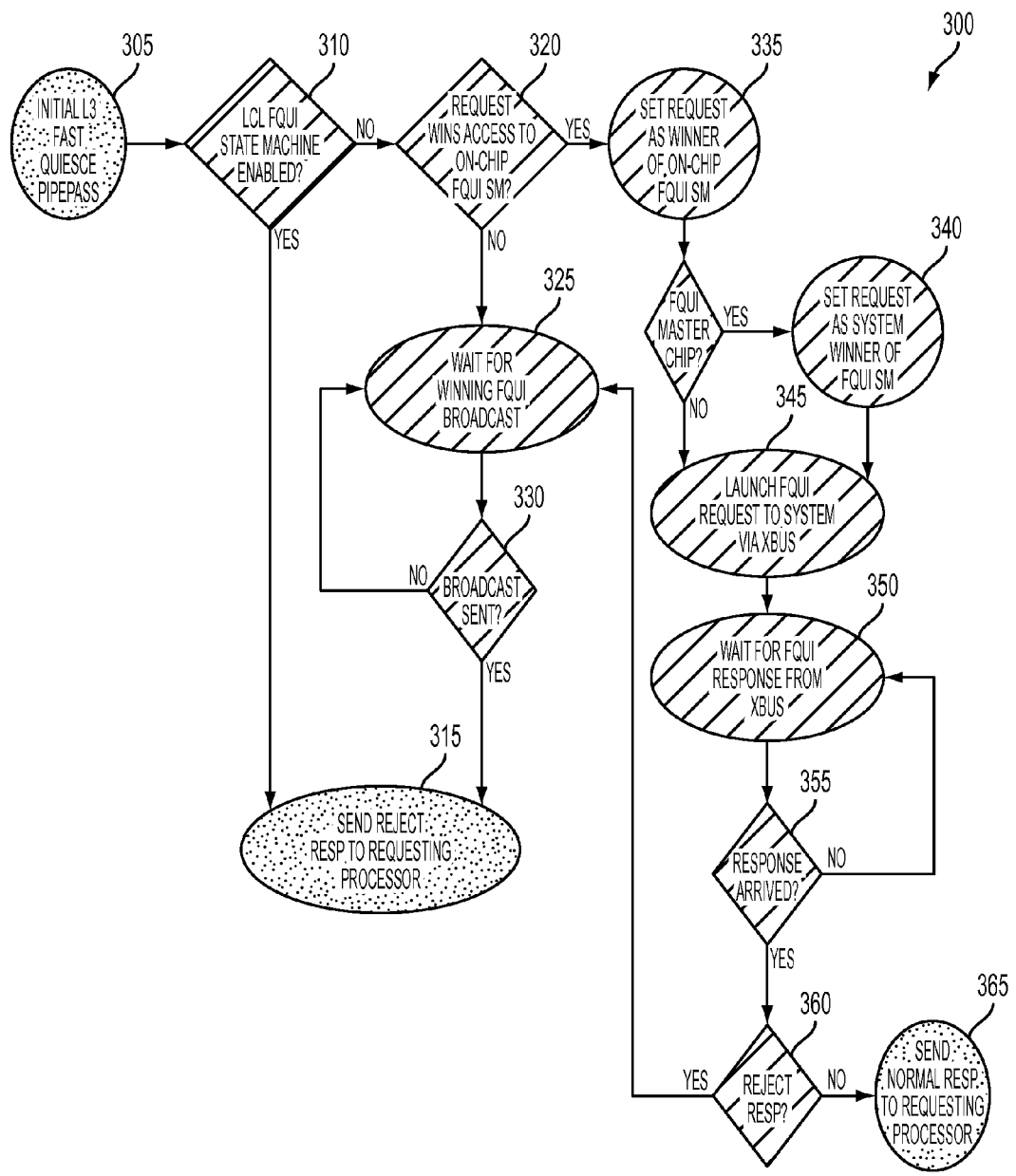
FIG. 5 depicts a process flow for managing communication between processors and components of a quiesce mechanism in a multi-processor system, in accordance with an embodiment.

FIG. 5 illustrates an embodiment of a method 300 of managing communication between processors and components of a quiesce mechanism in a multi-processor system. The method 300 is a flow diagram of the logic that performs control algorithms, including a reject control algorithm and/or a reject filtering algorithm. Although the method 300 is described in conjunction with the system 100, the method 300 can be utilized in conjunction with any of the processing devices and systems described herein, as well as with any device or system that includes multiple processors.

The method 300 is described herein using the CP 120 as an example, including the quiesce controller 195 and the QSM configured in this example as a fast quiesce state machine (FquiSM) 200. The FquiSM 200 may be the master FquiSM, or the master may be a different FquiSM located on another chip, MCM or server. A core 165 is described in this example as the initiating or requesting processor, which sends a fast quiesce (Fqui) request to the FquiSM. It is to be understood that embodiments and methods described herein are not limited to this example, and may include processors, controllers and other components of any suitable multi-processor system.

If the Fqui request encounters another accepted request ahead of it, the Fqui must reject back to the initiating core 165, which causes the core to retry the Fqui (a reject/retry loop). The methods and algorithms described herein "flatten" the core by nesting the reject/retry loop for subsequent Fqui requests that arrive during the window when the accepted request is currently in progress, but the master FquiSM has not yet sent the broadcast to the initiating core 165 and the other cores in the system to stop new requests.

The reject control algorithm works on the implication that if a Fqui reject occurs in response to a current Fqui request, it is due to the current Fqui request having lost access to the FquiSM. It implies that another Fqui request will win and that the rejected Fqui request will eventually see the winning Fqui request via a system broadcast by the master FquiSM. This system broadcast will then trigger the reject response to the current FquiSM, which is sent to the initiating processor. In this way, the nest logic in the FquiSM will hold on to the pending reject response until it has been guaranteed that the requesting core has seen the winner's broadcast.

Turning again to FIG. 5, a given processor, such as a core 165, sends a fast quiesce (Fqui) request to the quiesce controller 195 in the L3 cache controller 185. In one example, the quiesce controller 195 is a local controller that includes a local FquiSM 200, and the master FquiSM is located on a different CP and/or server. In another example, the local FquiSM 200 is the master FquiSM. The quiesce controller 195 receives and stores the Fqui request by, e.g., ingating a register such as a L3 Millicode Facilitation Address Register (MFAR).

At block 305, the MFAR or other register (e.g., controlled by microcode or millicode) makes an initial request into the L3 cache pipeline to query the local copy of the Fqui State Machine, e.g., the local FquiSM 200. At block 310, a pipeline controller or other entity determines whether the local FquiSM 200 is enabled, i.e., is currently performing another fast quiesce. An indicator such as an 'enbl' latch may be set to indicate that the FquiSM is enabled.

At block 315, if the local FquiSM 200 is already busy (i.e., enabled) with a previously loaded Fqui operation, and the local FquiSM 200 has already seen a broadcast indication that the master FquiSM has broadcast the previously loaded Fqui operation, the quiesce controller 195 sends a reject response to the initiating core 165. For example, the current Fqui request in the pipeline has lost access and is allowed to proceed with a second pipeline request to forward the reject response back to the requesting processor, e.g., the core 165.

The local FquiSM can determine that the broadcast has been sent by a suitable indicator that is configured to be set when the broadcast is detected. For example, an 'enbl' latch 205 is configured to be set when the broadcast is detected.

At block 320, if the local FquiSM is not in the 'enabled' state, the quiesce controller 195 determines whether the current Fqui request is the winning request. If the local FquiSM has already been loaded with another Fqui request, the current request that is making the pipe pass has not won access and will ultimately need to be rejected.

However, at block 325, to prevent the possibility of multiple reject/retry/reject loops between the requesting processor and the L3 cache controller, the MFAR quiesce controller 195 will transition to the mode which will send the reject response, but will hold up sending the reject (e.g., initiating a response pipe pass) until the winning Fqui request has gained access and the master FquiSM has made its quiesce broadcast. The quiesce controller detects whether the broadcast has happened (block 325), and will only allow the pipe pass to launch the reject (block 315) to the requesting processor once the broadcast has happened.

In one embodiment, the quiesce controller 195 (e.g., via a reject controller such as the L3 MFAR controller) detects that the broadcast has happened by monitoring an indicator such as a 'lpend' or Local Fast Quiesce Pending latch 210 (see FIG. 4) in the local FquiSM hardware.

When pipeline passes are made with new Fqui requests, and the passes detect that the 'lpend' latch is set, the quiesce controller (e.g., via the MFAR controllers) prepares a reject response. The reset condition for the 'lpend' latch is the broadcast of the system-wide winning fast quiesce request. The reset of this latch triggers any local quiesce requestors (e.g., local MFARs) currently holding pending Fqui rejects to forward these reject responses to their respective cores. In this way, the rejects will arrive at the requesting cores after these cores have seen the winning quiesce broadcast so they will not be needlessly retried and will not risk being escalated into slower conventional quiesce requests.

This 'lpend' latch may also be used to filter the outbound fast quiesce requests. For example, if this latch is set, no other on-chip Fqui request will be forwarded off chip via, e.g., an expansion bus (XBUS). Without this latch, in cases where the Master FquiSM is not the one on the same chip as the requesting processor, every Fqui request would have to be launched off chip to determine the winning request, leading to much higher traffic on this shared system busses.

If the current Fqui request is the winner (e.g., the 'lpend' latch is not set during the initial Fqui L3 pipe request query), the current request is marked as the on-chip Fqui request winner at block 335 (e.g., the 'lpend' latch is set for the current requestor.)

If the local CP chip also happens to be tagged as the Fqui Master chip, then the current request is also marked as the system wide Fqui request winner, at block 340. In either case, whether the current request is the system wide winner or only the local winner, at this point the request is launched off chip to the rest of the system (block 345), e.g., via the XBUS. The Fqui request will then be propagated to all the other Fqui SM instances on all the other chips in the system.

The local quiesce controller 195 waits for a response from the other chips in the system (block 350) until the response arrives, e.g., via the XBUS (block 355).

If the request gains access first to the FquiSM on the master chip, or if the local chip was the master, the XBUS will ultimately return a normal response (block 360). If the response is normal, at block 365, the quiesce controller will make a pipe pass to forward the normal response to the requesting core indicating it won access to the quiesce machine.

If another request from some other CP chip beats the outstanding request to the Master FquiSM, a reject response is returned to the requesting CP chip over the XBUS (block 360). Upon receipt of this reject response, the requesting CP chip will prepare to forward the reject response to the core, but will wait until the winning broadcast has taken place.

For example, the MFAR detects this has happened by monitoring the local Fqui SM's 'lpend' and 'enbl' latches. If the 'enbl' is set, but the 'lpend' is not, this means the Master Fqui SM was won by a request from another chip. Since the 'enbl' is not set until the broadcast takes place, the MFAR can infer from seeing the 'enbl' latch set that the broadcast has happened and will then release the pipe block on the pipe pass that will launch the reject response to the requesting processor. Again, this ensures, even in the case where the winning request was from a core on another chip, drawer or node, that the rejects will arrive at the requesting cores after these cores have seen the winning quiesce broadcast so they will not be needlessly retried and will not risk being escalated into slower conventional quiesce requests.

Technical effects and benefits include improving the performance of multi-processor systems by reducing the number of messages between processors and controllers required for quiesce operations. For example, embodiments described herein nest the reject/retry loop for subsequent quiesce requests that arrive during the window when an accepted request is currently in progress but hasn't yet sent the broadcast to cores to stop new requests. As a result, overall quiesce performance is improved because processors are not needlessly collecting multiple rejects for the same repeated request (and potentially escalating to slower conventional quiesce). In addition, the winning quiesce request is not delayed by waiting for a core or cores to collect any outstanding responses from outstanding quiesce requests that are slated to be rejected.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 6:
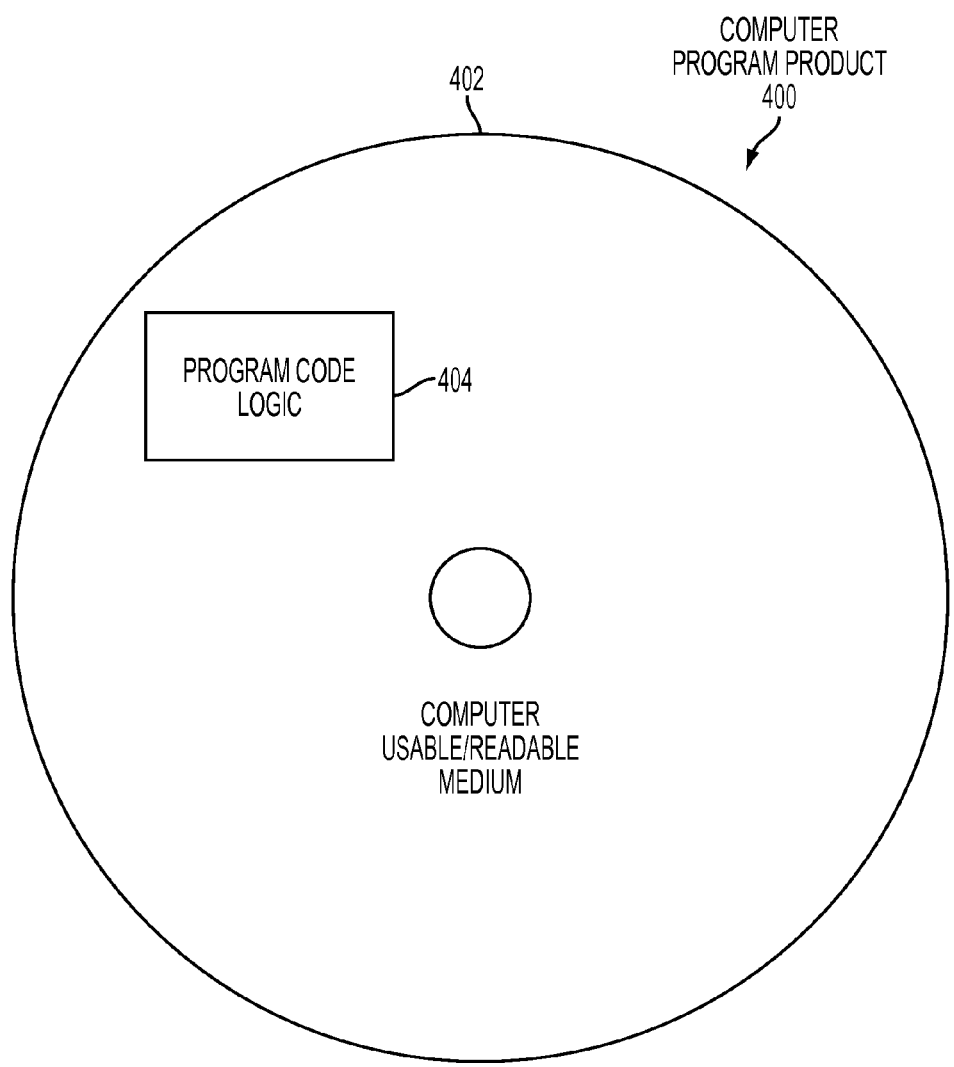
FIG. 6 depicts a computer-readable medium according to an embodiment.

Referring now to FIG. 6, in one example, a computer program product 400 includes, for instance, one or more storage media 402, wherein the media may be tangible and/or non-transitory, to store computer readable program code means or logic 404 thereon to provide and facilitate one or more aspects of embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for managing quiesce requests, the computer program product comprising:
    a computer readable storage medium having program instructions embodied therewith, wherein the computer readable storage medium is not a signal, the program instructions readable by a processing circuit to cause the processing circuit to perform a method comprising:
    receiving a quiesce request at a quiesce controller from a requesting processor, the requesting processor being one of a plurality of processors in a multi-processor system;
    determining that the quiesce request is not accepted by the quiesce controller;
    based on the quiesce request being not accepted by the quiesce controller, generating a reject message configured to indicate that the quiesce request has been rejected;
    holding the reject message until a quiesce command is broadcast to the multi-processor system, the quiesce command based on a different quiesce request; and
    sending the reject message to the requesting processor based on the broadcast of the quiesce command being detected by the quiesce controller.

2. The computer program product of claim 1, wherein the quiesce request is a fast quiesce request.

3. The computer program product of claim 1, wherein the quiesce controller includes a quiesce state machine (QSM) configured to track the progress of the quiesce command through the system, and determining that the quiesce request is not accepted includes determining a state of the QSM.

4. The computer program product of claim 1, wherein the quiesce request is one of a plurality of quiesce requests received at the quiesce controller, and the quiesce controller is configured to select one of the plurality of quiesce requests and transmit only the selected quiesce request based on a quiesce operation being not already in progress and the quiesce command having not been broadcasted.

5. The computer program product of claim 1, wherein the quiesce controller is part of a plurality of local quiesce controllers, each of the plurality of local quiesce controllers configured to receive quiesce requests from a respective group of processors, one of the plurality of local quiesce controllers being a master quiesce controller.

6. The computer program product of claim 5, wherein the quiesce controller is configured to, based on the quiesce request being accepted, transmit the quiesce request to all of the local quiesce controllers, and receiving a response from the master quiesce controller.

7. The computer program product of claim 6, wherein determining that the quiesce request has not been accepted includes receiving the response indicating that the master quiesce controller has not accepted the quiesce request.

8. The computer program product of claim 5, wherein each of the plurality of local quiesce controllers is disposed at a central processing chip, and the respective group of processors is disposed at the central processing chip.

9. The computer program product of claim 1, wherein the broadcast is detected by the quiesce controller based on a local quiesce pending indicator configured to be set upon receipt of the broadcast by the quiesce controller.

10. A computer implemented method for managing quiesce requests, the method comprising:
- receiving a quiesce request at a quiesce controller from a requesting processor, the requesting processor being one of a plurality of processors in a multi-processor system;
- determining that the quiesce request is not accepted by the quiesce controller;
- based on the quiesce request being not accepted by the quiesce controller, generating a reject message configured to indicate that the quiesce request has been rejected;
- holding the reject message until a quiesce command is broadcast to the multi-processor system, the quiesce command based on a different quiesce request; and
- sending the reject message to the requesting processor based on the broadcast of the quiesce command being detected by the quiesce controller.

11. The method of claim 10, wherein the quiesce request is one of a plurality of quiesce requests received at the quiesce controller, and the quiesce controller is configured to select one of the plurality of quiesce requests and transmit only the selected quiesce request based on a quiesce operation being not already in progress and the quiesce command having not been broadcasted.

12. The method of claim 10, wherein the controller is a plurality of local quiesce controllers, each of the plurality of local quiesce controllers configured to receive quiesce requests from a respective group of processors, one of the plurality of local quiesce controllers being a master quiesce controller.

13. The method of claim 12, wherein the quiesce controller is configured to, based on the quiesce request being accepted, transmit the quiesce request to all of the local quiesce controllers, and receiving a response from the master quiesce controller.

14. The method of claim 13, wherein determining that the quiesce request has not been accepted includes receiving the response indicating that the master quiesce controller has not accepted the quiesce request.

15. The method of claim 12, wherein each of the plurality of local quiesce controllers is disposed at a central processing chip, and the respective group of processors is disposed at the central processing chip.

16. The method of claim 10, wherein the quiesce controller includes a quiesce state machine (QSM) configured to track the progress of the quiesce command through the system, and determining that the quiesce request is not accepted includes determining a state of the QSM.

17. The method of claim 10, wherein the broadcast is detected by the quiesce controller based on a local quiesce pending indicator configured to be set upon receipt of the broadcast by the quiesce controller.

18. The method of claim 10, wherein the quiesce request is a fast quiesce request.

* * * * *